United States Patent
Fimoff et al.

[11] Patent Number: 5,905,732
[45] Date of Patent: May 18, 1999

[54] PCR RESTAMPER

[75] Inventors: Mark Fimoff, Hoffman Estates; Ronald B. Lee, Northbrook; Andrew E. Nunns, Naperville, all of Ill.

[73] Assignee: Zenith Electronics Corporation, Glenview, Ill.

[21] Appl. No.: 08/697,544

[22] Filed: Aug. 27, 1996

[51] Int. Cl.⁶ .......................................... H04J 3/06
[52] U.S. Cl. .............................................. 370/516
[58] Field of Search ....................... 370/474, 476, 370/395, 397, 503, 508, 516, 517, 519; 375/371, 372; 348/423, 474, 500, 432, 434, 497

[56] References Cited

U.S. PATENT DOCUMENTS

| | | | |
|---|---|---|---|
| 5,467,342 | 11/1995 | Logston et al. | 370/395 |
| 5,521,927 | 5/1996 | Kim et al. | 348/423 |
| 5,640,388 | 6/1997 | Woodhead et al. | 370/468 |
| 5,663,962 | 9/1997 | Caire et al. | 370/535 |

*Primary Examiner*—Ajit Patel

[57] ABSTRACT

An MPEG multiplexed data transmission system accepts data from a plurality of sources and supplies them, on a packet basis, to a common data stream. The non uniform jitter experienced by the packets is determined by subtracting the average delay for packets in a program from the current packet delay. PCR packets have their time base extracted, corrected for the calculated non uniform time delay and replaced as the PCR packet is supplied to the common data stream. Only PCR packets are modified

9 Claims, 5 Drawing Sheets

PCR RESTAMPER

CROSS REFERENCE TO RELATED APPLICATION

This application discloses material claimed in copending application Ser. No. 08/691/461 filed Jun. 27, 1996 of the inventors.

BACKGROUND OF THE INVENTION AND PRIOR ART

This invention relates generally to data transmission systems and particularly to data transmission systems that use MPEG 2 encoded data streams.

The environment of the invention is a plurality of program sources, each of which transmits an MPEG (Motion Picture Experts Group) 2 transport stream, representing a single program running at a data or byte rate that is substantially constant, but different from the byte rate of any other program. Further, the system is entirely asynchronous, i.e. the clock signal that generates the byte rate of any particular program is not locked to the clock signal of any other program. The problem is to multiplex the various streams of data onto a single path that has a fixed byte rate that is not locked to any of the program clock signals. The multiplexing arrangement should ideally be optimized for minimal jitter where jitter is defined as the variation in delay experienced by any program in the transmission of its data packets through the multiplex link. Jitter is undesirable because it requires the addition of expensive buffer memory in the receiver. The MPEG transmitter assumes that the transmitted data will undergo a constant delay on its way to the receiver. The MPEG decoder in the receiver will work properly only if it is supplied with data at a constant rate. Any delay variation in the transmission path is equivalent to a non constant delay and if it occurs, added buffer memory is required. This memory is used as an elastic buffer to smooth the received jittered data to the near constant rate required by the MPEG decoding circuitry. As jitter increases, the need for additional buffer memory increases.

The MPEG 2 type data transport system is a well-defined entity, composed of data packets, each containing 188 bytes. The prior art already has a product that multiplexes a number of MPEG 2 transport streams of differing packet rates, the clocks of which are locked together to a single stream in which the byte rate is also locked to those of the input signals. The invention claimed in the copending application is directed to a system that will accomplish the multiplexing task with individual transport streams and a common multiplexing stream having different byte (or packet) rates and completely asynchronous clock signals.

In the MPEG transport stream special program clock reference (PCR) packets are inserted on an arbitrary basis, but no less than every 0.1 seconds. The PCR packet includes a PCR time base consisting of 48 bits (six bytes), which define a time stamp. The time stamp indicates the relative time that the PCR packet was sent by the program source. The PCR packets have headers and a flag to enable their recovery at the receiver set top box (STB) where they are used to synchronize the STB clock to the source clock. The "base" portion of the time stamp consists of the first 33 bits which measure time in "90 KHz ticks" which is an increment of time for one cycle of a 90 KHz signal. Constant delays experienced by the packets in a program data stream are not of importance since they do not affect the relative PCR time base values. Non uniform delays or jitter, however, disrupt the time base relationships and make the task of clock recovery at the STB more difficult, if not impossible in some cases. At the very least, uncompensated non uniform delay in the PCR time bases requires more memory in the STB, which is expensive. The present invention compensates the PCR packets for the non uniform delay introduced by multiplexing.

OBJECTS OF THE INVENTION

A principal object of the invention is to provide an improved data transmission system.

Another object of the invention is to provide a novel MPEG multiplex system for use with a plurality of asynchronous data streams having differing byte rates.

A further object of the invention is to provide an MPEG 2 transport stream multiplexing system that corrects the PCR packet time base for non uniform jitter among the independently clocked transport stream sources.

BRIEF DESCRIPTION OF THE DRAWINGS

These and other objects and advantages of the invention will be apparent upon reading the following description in conjunction with the drawings, in which.

DESCRIPTION OF THE PREFERRED EMBODIMENT

Figure 1:
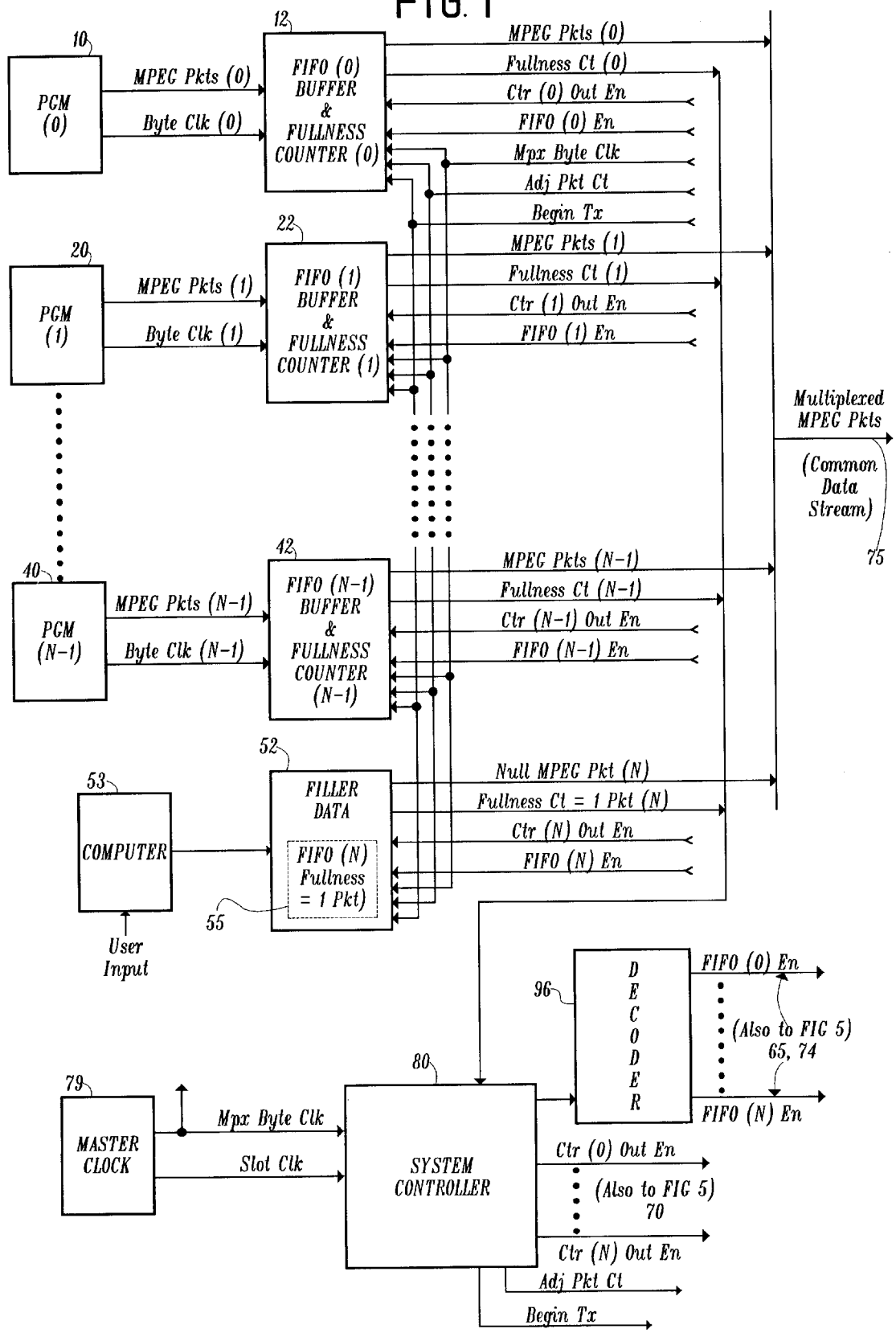
FIG. 1 is a block diagram of an MPEG transport multiplexing system.

FIG. 1 shows a multiplexer constructed in accordance with the invention claimed in the copending application in which N program (PGM) sources indicated as PGM (0), PGM (1) . . . PGM (N−1), are multiplexed to a common data stream 75. The reference numerals 10, 20 . . . 40 supply MPEG 2 transport packets (Pkts) to a corresponding plurality of first-in, first-out (FIFO) buffers (0), (1) . . . (N−1) and their associated fullness counters. As indicated, each program source has its own byte clock (ByteClk). These FIFO buffers and associated fullness counters are indicated by reference numerals 12, 22 . . . 42.

A filler data block 52 is shown coupled to a computer 53 that may receive user input As illustrated in dotted lines, filler data block 52 may simply contain a FIFO (N) that holds a null packet which may comprise a ROM with no input that holds 188 bytes (one packet) of null data. The null FIFO version is the described embodiment of the invention. The null FIFO (N) supplies a packet of null data, as will be seen, to the multiplex line (common data stream) whenever none of the program FIFOs contains a full packet of data.

In a broader sense, no added data need be supplied to the multiplex line when there is less than a full packet of data in each of the program FIFOs. The multiplex slot may simply be left blank. Alternatively, as illustrated, filler data may be supplied, as required, to maintain the packet rate of the multiplex line. Such filler data may comprise non time sensitive data such as advertising, payment messages to customers, private messages, etc.

A master clock 79 provides a multiplex byte clock signal (MpxByteClk) and a slot clock signal (SlotClk) to a system controller 80. The SlotClk=MpxByteClk/188. System controller 80 supplies a state decoder 96 and provides counter output enable signals (Ctr(0 . . . N)OutEn) for each of the 0 to N counters. The state decoder 96 provides FIFO enable signals (FIFO(0 . . . N)En) to the N FIFOs. The system controller 80 also receives the fullness counts from each of the fullness counters in the N FIFOs.

Each of the 0-(N–1) FIFOs 12, 22 . . . 42 outputs the input MPEG packets to the common data stream 75 and its associated fullness count to system controller 80. N FIFO (52) outputs a null MPEG packet to the common data stream 75 and a fullness count equal to one packet to system controller 80. The fullness counts from the various FIFO/ counter arrangements are supplied in response to a CtrOutEn signal being supplied to them, respectively. Each of the FIFO/counters receives the MpxByteClk signal, an adjust packet count signal (AdjPktCt) and a begin transmission signal (BeginTx).

Figure 2:
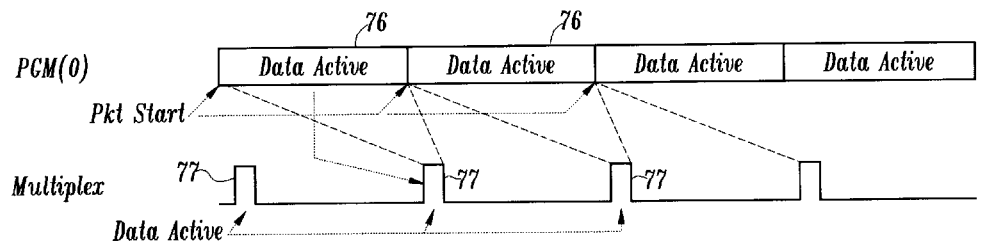
FIG. 2 indicates multiplexing of a program source to a common multiplex line.

FIG. 2 indicates the multiplexing of the packet of a single program [in this instance PGM(0)] to the common multiplex line or data stream 75. Only a single program source PGM(0) is assumed to be active for this illustration. The multiplex line can be thought of as containing a series of continuous slots at a fixed rate where each slot contains one packet. Each packet of data 76 is applied to a slot 77 in the common multiplex stream It will be appreciated that slot 77 is only one of may slots in the multiplex stream. For example; assume in the simplified case illustrated that PGM(0) has a packet rate of 10 packets per second. Also assume that the common multiplex stream can accommodate 100 packets per second. This is equivalent to a slot rate of 100 slots per second. On the multiplex, data is output from FIFO(0) in a bursty manner; occupying ¹⁄₁₀ of the available slots. Thus the input to FIFO(0) is continuous while its output is in bursts. These bursts are exactly evenly spaced because the packet rate of PGM(0) and that of the multiplex stream have an exact integral relationship. This is, of course, an idealized example. In reality the packet rate of any particular program will not have an integral relationship and not be locked to the packet rate of the common multiplex stream. In that event; each of the bursts will not be perfectly spaced in the common multiplex stream and will have some small time displacement (equal to some minimum number of slot times) from where it is supposed to be. Over time, a peak-to-peak time displacement in the packets for PGM(0) will be observed and this is referred to as peak-to-peak jitter (F). This jitter can also be viewed as an uneven spacing between packets for a particular program on the multiplex line.

In a practical situation, N will be greater than 1, and all of the programs will "compete" for slots on the common data line. This will result in additional jitter. As M, which is defined as the combined packet rate for the N streams, approaches the slot rate of the multiplex line, there will be more competition for slots and more jitter. As discussed above, it is important to minimize jitter because jitter creates a need for a larger buffer at the receiver end. It is the multiplexing algorithm that decides which program gets the next slot in the multiplex line. Ideally the algorithm should keep jitter low and about equal over the group of input programs.

In determining jitter, the byte rate of the program is very important assume that the multiplexing process causes two programs, one with a rate of 2 Mbytes per second and the other with a rate of 0.2 Mbytes per second, each to be displaced in time (time jitter) from their nominal positions by 1 millisecond. While the time jitter for both programs is identical, the byte displacement (byte jitter) for the faster program is 2000 bytes whereas for the slower program it is only 200 bytes. The slower program is much more tolerant of the time displacement that the faster program. Therefore the multiplexing algorithm should cause the higher rate programs to suffer proportionally less time jitter that the lower rate programs. This will tend to equalize the byte jitter so that the buffer size needed in the receiver remains about the same regardless of the rate of the program being received.

One multiplexing approach (in the nature of a "round robin") is to check each FIFO at the beginning of each slot time until one with at least one full packet is found. If none is found, wait until the next slot time. If a packet is found, that packet is sent to the common multiplex stream and at the next slot time checking is resumed beginning with the next FIFO. With such a system, a packet entering a FIFO for any particular program may experience a small or a large delay before being sent to the multiplex stream. This delay is dependent upon the packet's arrival time, the arrival time of packets for other programs and the checking order. This variation in delay will cause uneven spacing (jitter) for packets for a particular program on the multiplex line. Also there is no proportionality between the jitter and the rate of the particular program. Therefore high rate programs can experience the same amount of time jitter as lower rate programs. This may result in very severe byte jitter for the high rate programs.

A "time stamp" approach could also be used in which upon arrival of a packet in a FIFO, it would be given a time stamp and at each time slot the packet with the oldest time stamp would be placed on the multiplex line. This approach has a negative impact upon a high data rate program that is being multiplexed with many lower data rate programs. For example, a packet for the high rate program may in one instance be sent to the multiplex soon after it arrives in its FIFO, but in another instance suffer a long delay because many packets for the lower rate programs have just arrived prior to the high rate program's packet and it must wait for all of them to be sent to the multiplex line. This results in a large delay variation (jitter) incurred by a high rate program.

Another potential solution is described as follows. At each slot time examine all of the FIFO's. Of those FIFO's that contain at least one complete packet, choose the FIFO serving the highest byte rate program and send that packet to the multiplex line. The difficulty here is that when multiplexing a number of programs of about equal data rate, the program with the slowest data rate will always have the lowest priority and will always suffer a time jitter out of proportion to the relatively small rate difference among the various programs.

A better solution results if we argue that the fullness of a FIFO has an equivalence to potential jitter. Assume that during the multiplexing process, the fullness of a particular FIFO varies between 0 and F bytes. When there are F bytes in the FIFO, the oldest packet in the FIFO has been delayed by F bytes. Thus a FIFO whose fullness varies between 0 and F bytes has a delay that varies between 0 and F bytes. Therefore the peak-to-peak jitter is F bytes. It appears that multiplexing should try to equalize the maximum fullness (F) of all the FIFOs so as to equalize the peak-to-peak jitter F. (F for all of FIFOs should be about the same.) Also in equalizing F for each FIFO, F for any particular FIFO cannot become unreasonably large, thus preventing any program from suffering large peak-to-peak jitter.

An algorithm that gives slot access priority to the program with the fullest FIFO tends to equalize FIFO fullness for the programs and thus to equalize the peak-to-peak byte or packet jitter incurred by each program.

In accordance with the above, the FIFO with the largest amount of data in excess of one packet would place one packet on the multiplex line. If none of the FIFOs had at least one packet, then a null packet would be supplied to fill the slot in the common stream. The empirical results of such an approach indicate a bias against the higher rate programs with the higher its packet rate, the more jitter the program experiences. This bias occurs because the packet rate of the higher rate programs is closer to the slot rate than the packet rate for lower rate programs. The effect of the FIFO delay variation being quantized in slot times is proportionally more significant for higher rate programs since a delay variation of one slot time for a high rate program involves many more bytes than a delay variation of one slot time for a low rate program.

A further improvement to reduce the effect mentioned above is to multiply the FIFO fullness (in excess of one packet) by the program byte rate. This overcomes the bias against higher rate programs, but to such an extent that it creates a bias in favor of the higher rate programs.

The preferred form adds to the FIFO fullness count a factor consisting of the number of additional bytes that will enter the FIFO one slot time in the future multiplied by an empirically determined constant K. This calculation is performed at each slot time. The FIFO that achieves the highest result (score) will send a packet of data to the multiplex line. If the fullness count for a FIFO is less than 188 bytes (one packet), its score is set to 0 because only complete packets can be sent to the multiplex line. This approach provides a reasonable advantage to the higher rate programs but not so drastic as simply multiplying the FIFO fullness by the program byte rate. The number of bytes that will enter the FIFO for a particular program in a slot time can be loaded into a microcontroller at initialization if all of the program byte rates are known ahead of time. Alternatively, the microcontroller can note the fullness increase of each FIFO from one slot time to the next and calculate the byte rate of each program. The selection of K is dependent upon how close the combined packet rate of all of the programs being multiplexed is to the packet rate of the multiplex line. The constant K can be chosen automatically by first setting it to an initial value of one, commencing the multiplexing process while the microcontroller notes the peak-to-peak jitter F incurred by each program and adjusting K in either direction until it optimizes jitter, i.e. finds the best equalization of the peak-to-peak jitter F for the programs.

It should also be noted that it is not essential that the byte rates of the programs being multiplexed be exactly constant so long as the variation in the byte rate is not great from one slot time to the next.

Figure 3:
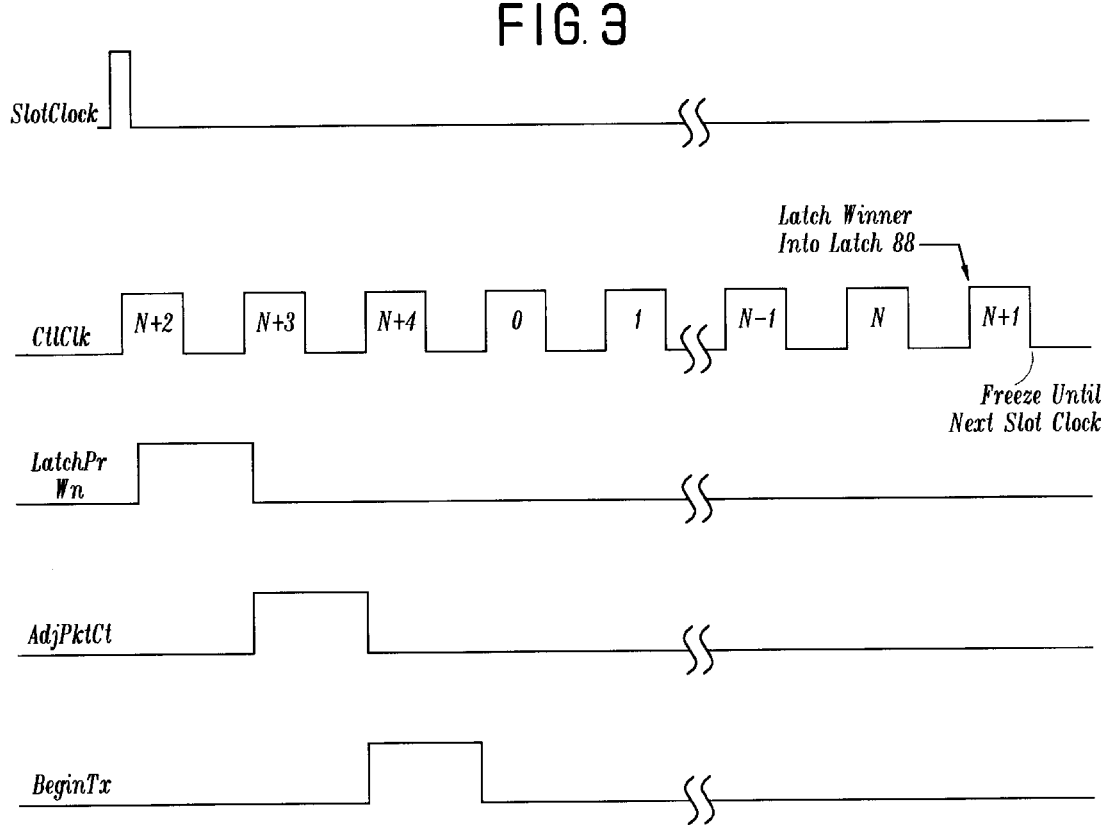
FIG. 3 is a series of waveforms illustrating timing for the system.

The priority calculations must be performed prior to the determination of which program is to be supplied next to the multiplex line. The described embodiment involves establishing various states by a control clock (CtlClk) that is initiated by SlotClk. As indicated in FIG. 3, these states are characterized by N+2, N+3, N+4, 01 and −1 and N+1 where the CtlClk is frozen until occurrence of the next SlotClk and N is equal to the number of programs being multiplexed A latch prior winner (LatchPrWn) signal is established at the beginning of state N+2 and continues to the beginning of state N+3. The AdjPktCt signal is established at the beginning of state N+3 and terminated at the beginning of state N+4. The BeginTx signal is established at the beginning of state N+4 and terminated at the beginning of state 0.

Figure 4:
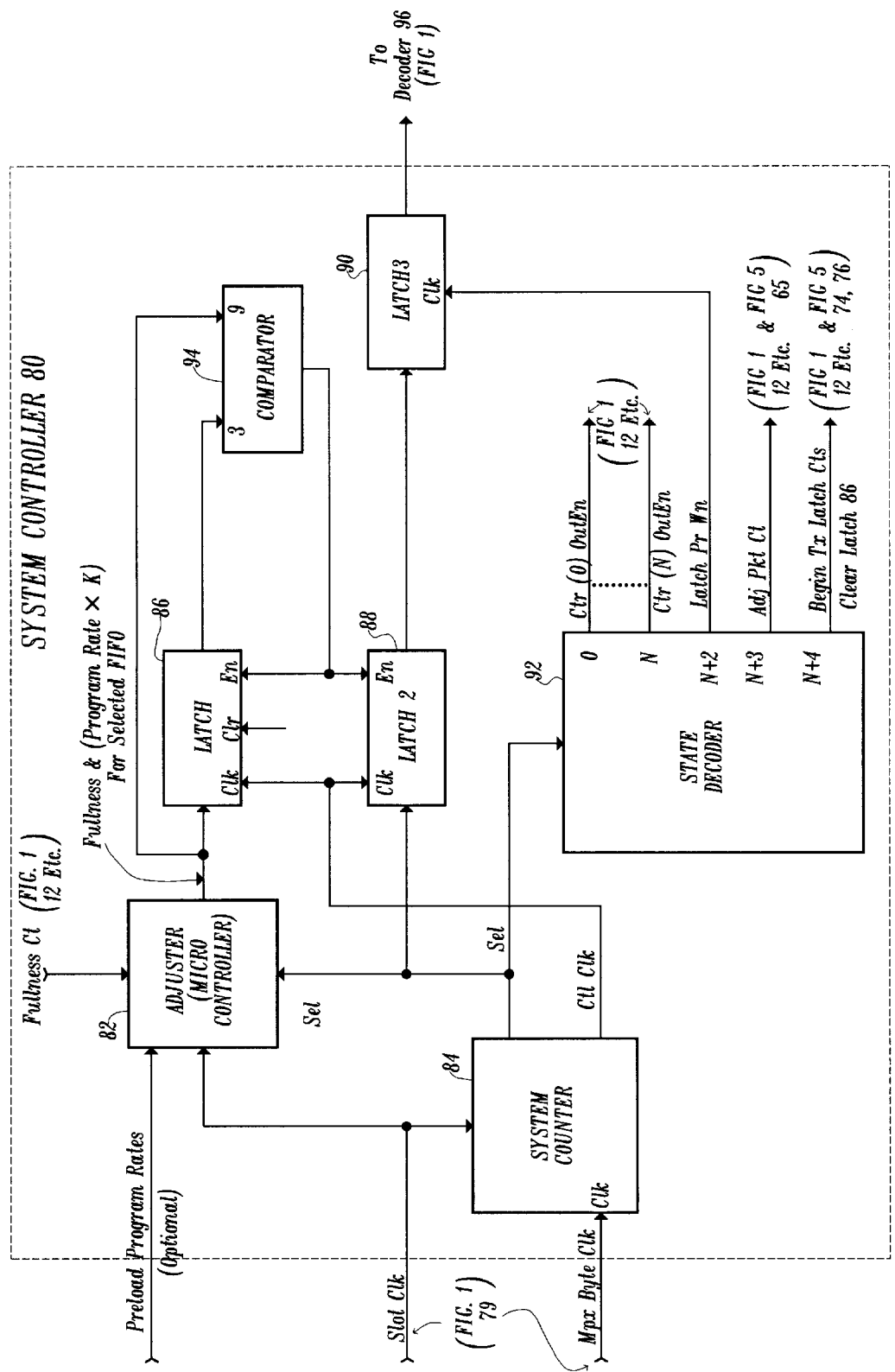
FIG. 4 is a block diagram of the system controller of FIG. 1.

FIG. 4 shows system controller 80 in more detail. It includes an adjuster, in the form of a microcontroller 82, a system counter 84, a first latch 86, a second latch 88, a third latch 90, state decoder 92 and a comparator 94. One input to adjuster 82 is the fullness count from the FIFO counters. A preload of the program rates for the various program sources is indicated as an optional connection. The SlotClk signal is supplied to the adjuster 82 and to system counter 84 and the MpxByteClk signal is applied to system counter 84. System counter 84 supplies a select (SEL) signal to adjuster 82, to latch 88 and to state decoder 92 and supplies the CtlClk signal to latches 86 and 88. The adjuster 82 develops the score which is the buffer fullness (in excess of one packet) plus a factor comprising the program byte rate multiplied by constant K for each selected FIFO and supplies the score to latch 86 and to comparator 84. The output of latch 86 is supplied to the other input of comparator 94 and the output of comparator 94 supplies the enable inputs of latches 86 and 88. The output of latch 88 is supplied to latch 90 along with the LatchPrWn signal from state decoder 92. The output of latch 90 is supplied to decoder 96 (FIG. 1).

Figure 5:
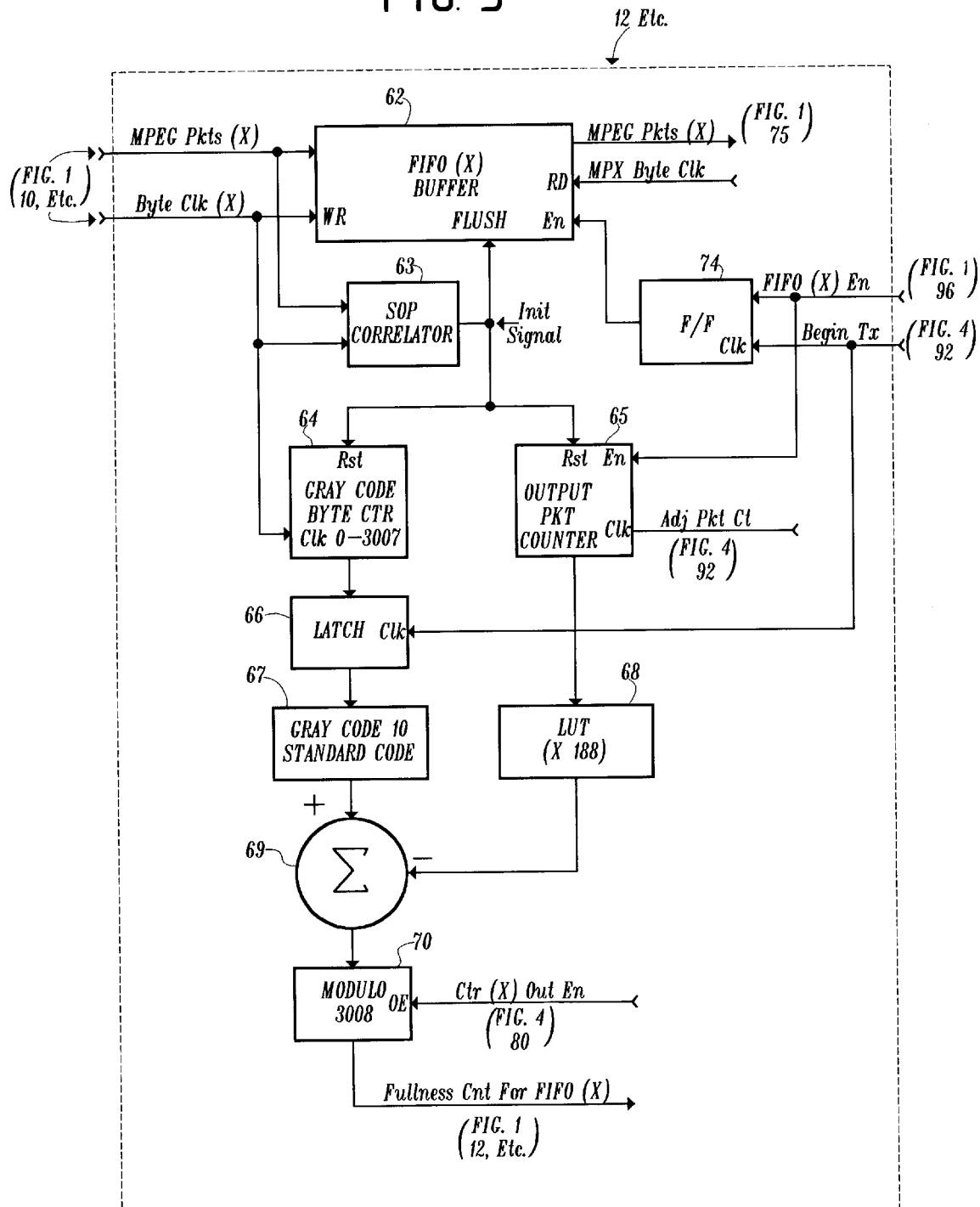
FIG. 5 shows the details of a FIFO buffer and corresponding fullness counter.

FIG. 5 is a more detailed depiction of any of the FIFO buffers and counters 12, 22 and 42. The FIFO buffer (X), identified by reference character 62, is enabled by a signal from a block 74 that is supplied with the FIFOEn and BeginTx signals. An SOP (start of packet) correlator 63 is coupled to the flush input of FIFO buffer 62 and to the reset terminal of a gray code byte counter 64 and an output packet counter 65. The output of gray code counter 64 supplies a latch 66 that in turn is coupled to a gray-code-to-standard-binary-code converter 67 which feeds the positive input of an adder 69. The output of packet counter 65 is coupled to a look up table (LUT) 68 which, in turn, is coupled to the negative input of adder 69. The output of adder 69 is coupled to a modulo converter 70 which develops the fullness count for the FIFO buffer. The modulo converter 70 is operated in response to the CtrOutEn signal from system controller 80 (FIG. 4).

In operation, the adjuster 82 (FIG. 4) adds to the fullness count (FIG. 5) from the selected fullness counter (FIG. 1) a number of bytes that the selected FIFO will receive in one slot time of the common data stream (multiplex line) multiplied by factor K. This is the score for that FIFO. If the fullness count is less than 188 bytes, the adjuster 82 will give the FIFO a score of 0. As indicated, the number of bytes received in one slot time can be preloaded to adjuster 82, or can be calculated by observation of the microcontroller in adjuster 82. For the case of the null FIFO, which receives no data, the number of bytes received in one slot time is 0. Therefore its score will always be 188. The factor K is preferably determined as previously indicated. The score comparison (FIG. 4) is driven by system counter 84 and is reset to zero by the SlotClk. In response to each MpxByteClk, system counter 84 establishes the states, 0 to (N+4) and freezes itself until the next SlotClk. The system counter SEL output is re-encoded so that 0 to (N+4) becomes (N+2), (N+3), (N+4), 0, 1 . . . (N), (N+1). The system counter outputs the SEL signal to state decoder 92 which generates the sequence of CtrOutEn signals followed by the LatchPrWn, AdjPktCt, and BeginTx signals. Prior to changing state, system counter 84 also produces a CtlClk signal just prior to entering states 0 . . . (N+1). The system controller 80 goes through a sequence of operations or states that repeat every slot time. The sequence is initialized by the SlotClk and driven from state to state by the MpxByteClk.

When the final state is reached, the system counter 84 freezes until the next SlotClk.

Assume initially that the previous slot time has just ended and during that time a number has been latched in latch 88 representing the winning FIFO for the current slot (FIFO with highest score). The SlotClk starts the process by initializing the system counter 84 to state (N+2). This enables the LatchPrWn signal to latch a pointer to the winning FIFO for the current slot from latch 88 to latch 90 which results in a FIFOEn signal to the winning FIFO via state decoder 96 (FIG. 1). At state (N+3), the AdjPktCt signal is enabled to reduce the fullness count of the "winner" FIFO counter by one packet. At state (N+4) the BeginTx signal is enabled, causing the current scores of all FIFOs to be latched for the next slot contest and also causing the winning FIFO to begin to transmit one packet to the multiplex line. At this time, latch 86 is cleared to zero.

System counter 84 establishes state 0 next. This begins a series of comparisons in which the latched fullness count for each FIFO is, in turn, enabled onto a tri state bus and input to the adjuster 82, converted to a score by the adjuster 82 as previously explained, and compared to a latched value in latch 86 that represents the score of the FIFO with the highest score of those checked so far. If the fullness of a FIFO is less than 188 bytes (1 packet), adjuster 82 sets that FIFO's score to 0. The winning score of each comparison is saved in latch 86 and the number of the winning FIFO is saved in latch 88. The comparisons are repeated through state N which compares the score of the null FIFO, which is always 188 as previously explained, with the greatest score of all the other FIFOs. After system counter 84 reaches state (N+1), it freezes until the next SlotClk. The entry into state 0 begins the first comparison between the score of FIFO (0) and the 0 value residing in latch 86. The score of FIFO (0) is enabled to comparator 94 for comparison against the contents of latch 86. If FIFO (0) has a score equal to or greater than the 0 value in latch 86, its score is latched into latch 86 and its pointer value is latched into latch 88 by the CtlClk occurring just prior to entry into state 1. This process is repeated through state N which compares the score of null FIFO (N) (always 188) against the largest score of the other FIFOs. Upon entry into state (N+1), latch 88 will hold a pointer to the FIFO with the highest score. That value will remain in latch 88 because system counter 84 is frozen until the next SlotClk. If all of the FIFOs 1 through (N−1) have less than 1 packet, their scores will all be 0, the null FIFOs score of 188 will be the largest and the null packet will be sent to the multiplex line. If any of the FIFOs 1 through (N−1) have at least 1 packet, its score will be greater than the score for the null FIFO because that FIFOs score will have to be greater than 188.

It will be appreciated that a similar operation occurs where the null FIFO takes the form of filler data that may be read out in packets under control of computer 53 for example. For the case where no data is supplied to the multiplex line 75 when none of the FIFOs contains a full packet, no comparison is made with the null or filler data FIFO and the corresponding slot in the multiplex stream remains empty.

The fullness count is derived by using two counters The Gray Code counter 64 counts bytes as they are input into the FIFO. A gray code count is used because the count value is sampled asynchronously by the BeginTx signal. As is known to those skilled in the art, the gray code insures that the latched value will be accurate to within one byte and prevents the latching of unreliable data present during a counter transition. The latched result in latch 66 is converted to standard binary code in converter 67 and supplied to adder 69. The output packet counter 65 counts packets and is incremented by the AdjPktCt signal whenever a packet is supplied from its FIFO to the common data stream 75. Its output is multiplied by 188, to convert it to bytes, and subtracted from the modified count provided by counter 64 to adder 69. The result is taken in modulo 3008 in modulo converter 70 to yield the current fullness in bytes of the FIFO (assuming that FIFO size=3008 bytes=16 packets).

At state (N+2) of LatchPrWn signal it causes the FIFOEn signal to be applied to the winning FIFO. At state (N+3), the AdjPktCt signal results in a reduction of one packet in the fullness count of that FIFO. At state (N+4) the BeginTx signal causes that FIFO to begin transmission of a packet to the multiplex line 75. This also results in the latching of the input counter values for all of the FIFOs, which are processed with their respective multiplied output counter values, so that they are ready for the next slot contest. It should be noted that only the winning FIFO is enabled for transmission to the common data stream or multiplex line 75 (and have its output packet counter decremented by one packet) because all of the operations are qualified by the FIFOEn signal.

It is obviously desirable to remove only complete data packets from a FIFO whenever it wins a slot. To achieve this, the FIFO must be empty at some initialization point and filled starting with the first byte of a data packet. Then any 188 bytes later will mark a complete packet. If the input stream for the program is interrupted and reconnected for example, the FIFO must be flushed and refilled starting with the first byte of an incoming packet. This is done automatically using the SOP correlator 63 which involves a well known correlation technique that searches for 47H (the MPEG transport start byte of packet) that are spaced 188 bytes apart. At power up, the SOP correlator 63 searches for the 47H pattern while holding the initiate (Init) signal active to empty the FIFO and prevent it from accepting data. When the correlator has found the 47H pattern with confidence it releases the Init line at the next start of packet point so that the FIFO starts filling at a packet boundary. If the pattern is ever interrupted by data errors or a physical disconnect, the SOP correlator 63 will detect the absence of the 47H spaced by 188 bytes and will assert the Init signal to empty and disable the FIFO. When the errors disappear or a physical reconnect occurs, correlator 63 again searches for and finds the packet boundary and releases the Init line.

Figure 6:
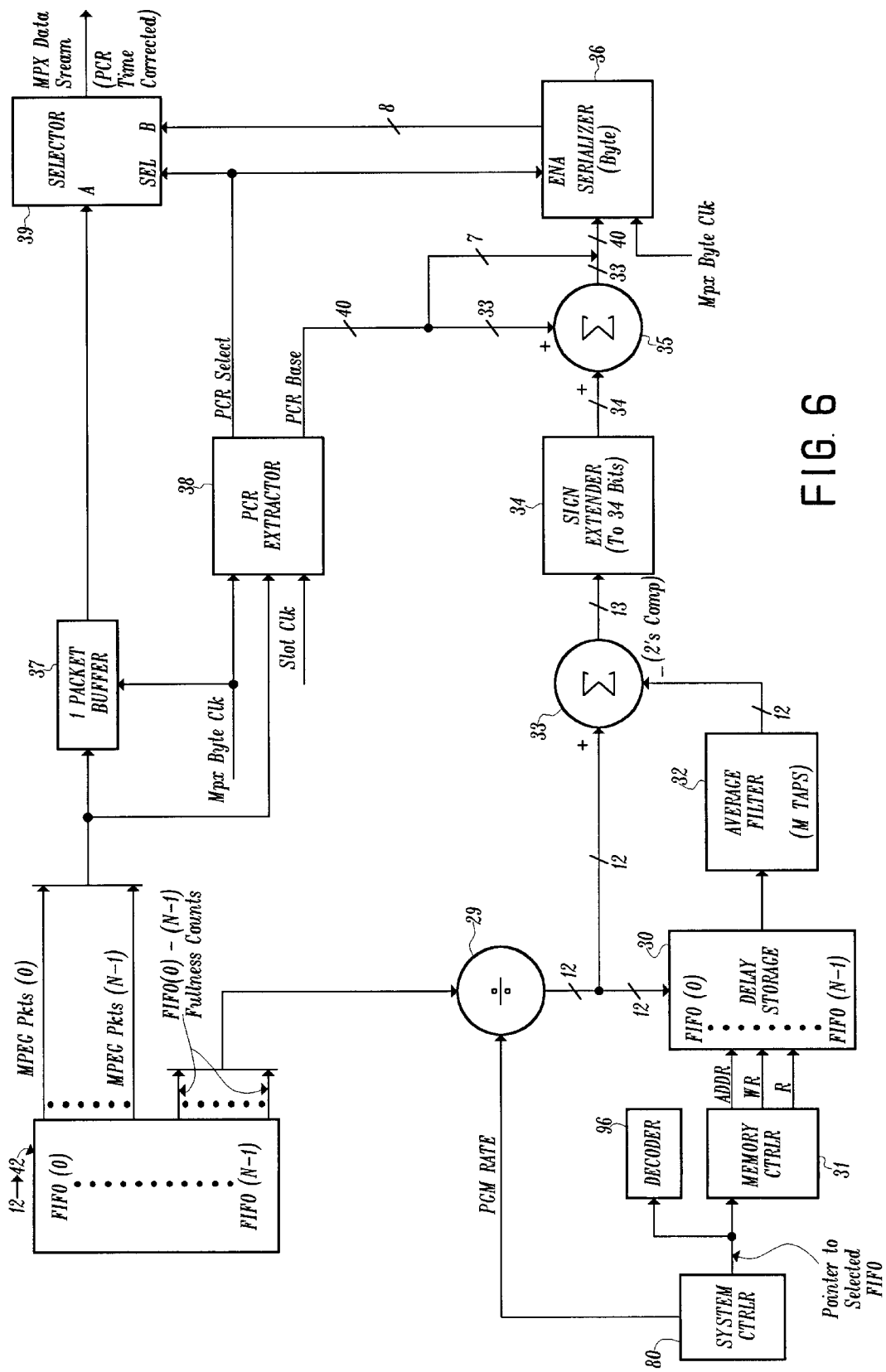
FIG. 6 is a simplified block diagram of the PCR restamper of the invention

FIG. 6 illustrates time base correction circuitry for PCR packets in the data streams As mentioned, the PCR packet includes identification information and a "time stamp" indicating when the PCR packet was sent by the program source. While the insertion of PCR packets in the data stream is arbitrary, they must be sent at least every 0.1 seconds. The PCR packets are recovered by a receiver set top box (STB) and the time base is used in a simple phase locked loop arrangement to match the STB clock to the program source clock. Non constant delays experienced by the packets disrupt the accuracy of the time base of the PCR packets, and for optimum efficiency in operation, it is desirable to correct the time base where possible.

The arrangement is called a "restamper" since it will correct the time stamp (time base) of a PCR packet to reflect the non uniform delay or jitter experienced by a packet due to multiplexing. (Uniform delay does not pose a problem and requires no correction of the PCR time base—the time base is relative, not absolute, so that delaying all packets by the same amount has no detrimental effect.)

The plurality of FIFOs 12–42 supply MPEG data packets (including PCR packets) to the common multiplex data stream 75, via a one packet buffer 37, to the A input of a selector 39. The buffer 37 introduces a one packet delay so that the PCR time base may be extracted by a PCR extractor 38, corrected as will be seen, and inserted in the PCR packet as the PCR packet is being sent out on the common data stream 75. It should be noted that all of the data packets pass through buffer 37 and selector 39, but only the PCR packets are modified.

The fullness counts (in bytes) for all of the FIFOs are supplied to a divider 29 where they are divided by the program rate of the corresponding programs in the respective FIFOs, which program rate is supplied from the system controller 80. Because the time base of the PCR is in 90 KHz ticks, the supplied program rate is measured in bytes per 90 KHz tick. As each packet leaves a FIFO when being supplied to the multiplex line, the delay that packet experienced in the FIFO is determined.

It will be recalled that the program sources supply data to the FIFOs at a constant rate so that the delay experienced by a packet leaving the FIFO may be determined by dividing the number of bytes in the FIFO by the program rate. Divider 29 supplies a delay storage 30 and an adder 33. Delay storage 30 stores a number (M) of the packet delay values determined for the packets of each FIFO under control of a memory controller 31 and system controller 80. System controller 80 supplies a selected FIFO pointer (corresponding to the packet being supplied to the common data stream) to memory controller 31 that controls the addressing, writing and reading of delay storage 30. Delay storage 30 supplies the last M packet delay values for packets from the corresponding FIFO to an averaging filter 32, which has M taps. The average of the M packet delay values is determined and supplied to the negative input of adder 33 where it is subtracted from the present packet delay value determined for the packet. The result of subtracting the average value is that the change (delta) in delay for the present packet is determined. The delta represents non uniform delay for which the PCR time base should be corrected. The larger the value of M, the more accurate the average will be. The average may be calculated using equal tap weights or may be calculated with a median filtering function or other type of filtering.

The output of adder 33 is the delta in 2's complement form, measured in 90 KHz ticks, and comprises 13 bits ranging from −4095 to +4095. This is supplied to a sign extender 34 where the 13 bit adder output is converted to a 34 bit 2's complement value, with sign extension, and applied to an adder 35 that receives the 33 bit PCR base from PCR extractor 38. The remaining 7 bits are untouched and bypassed around adder 35. It will be appreciated that while the PCR time stamp is 48 bits, only 33 are operated upon. Forty bits are extracted since that is more convenient. Adder 35 drops one bit of the 34 bit sign extended time base correction and adds the remainder to the 33 bits of the PCR time base to correct the PCR time base for the non uniform delay experienced by the data packet. It will be appreciated that, while a time base correction is determined for each packet, only the PCR packets are modified. The corrected time base for the PCR packet is supplied to a serializer 36 which reforms the data into bytes and supplies it to the B input of selector 39. A PCR select signal from PCR extractor 38 operates selector 39 to couple information from the buffer 37 (A) or the serializer (B) 36 to the common data stream 75, thus inserting the corrected time base into the PCR packet.

As mentioned, the purpose of the one packet buffer 37 is to allow time for the PCR packet extraction, correction and replacement. The PCR extractor 38 detects start of packet via the SlotClk and finds the PCR flag in the transport packet header. The five bytes PCR time base, which is at a known position in the PCR packet, is extracted. The time base consists of 40 bits, 33 of which form the time portion that is to be adjusted, and the delta from sign extender 34 is added. The other seven bits are not changed, and the result is supplied as a 40 bit (five byte) wide path to the serializer 36. After the next SlotClk, the packet begins to leave the buffer 37 and enters input A of selector 39 and is routed to the common data stream 75. At the proper time when the PCR base bytes are being read out of the butter 37, a PCR select signal causes the five byte PCR base stored in serializer 36 to be fed to the B input of selector 39 one byte at a time in response to the MpxByteClk signal. Simultaneously, the B input of the selector 39 is routed to the common data stream 75. Because the timing coincides with the PCR base bytes for the packet leaving the buffer 37, the PCR base value is replaced with the time corrected PCR base value.

What has been described is a novel technique for correcting PCR packets for non uniform jitter in a multiplexed MPEG data transmission system It is recognized that numerous changes in the described embodiment of the invention will be apparent to those skilled in the art without departing from its true spirit and scope. The invention is to be limited only as defined in the claims.

What is claimed is:

1. A method of operating a data transmission system comprising:

supplying streams of MPEG data packets from program sources to corresponding buffers, the program sources being asynchronoous and having different data rates;

multiplexing packets from the buffers, based upon an algorithm including buffer fullness and program data rate, to a common data stream;

calculating time corrections for the non uniform jitter experienced by the packets due to multiplexing, the time corrections being based upon an average time delay experienced by the packets in a buffer; and adjusting the time bases of the PCR (program clock reference) packets in the common data stream with the corresponding calculated time corrections.

2. The method of claim 1 wherein a packet time delay is determined by dividing buffer fullness by the program rate.

3. The method of claim 1, further comprising:

extracting the PCR time base from a PCR packet being multiplexed;

correcting the extracted PCR time base with the calculated time correction for the PCR packet; and inserting the corrected PCR time base in the PCR packet.

4. The method of claim 1, wherein said calculating time corrections comprises:

determining the time delay experienced by each packet in each buffer due to multiplexing;

storing the determined time delays;

averaging the determined time delays over a plurality of the packets for each buffer; and subtracting the average time delay from the determined packet time delay.

5. A method of operating a data transmission system comprising:

supplying N asynchronous, substantially constant streams of MPEG data packets from N program sources of differing packet rates to corresponding ones of N buffers;

multiplexing packets from the N buffers to a common data stream;

determining for each multiplexed packet the time delay experienced by that packet in its buffer;

storing the time delays for the packets of the N buffers for a plurality of packets;

determining an average packet time delay for each buffer;

calculating a time correction for each packet by subtracting the average packet time delay for its associated buffer from the determined time delay for the packet;

extracting the PCR (Program clock reference) time base from a PCR packet being multiplexed;

correcting the extracted PCR time base with the calculated time correction for the PCR packet; and inserting the corrected PCR time base in the PCR packet being multiplexed.

6. An MPEG data transmission system comprising:

means for supplying a plurality of non synchronous MPEG data streams of differing data rates, each comprising data packets, certain of said data packets in each said data stream comprising a PCR (program clock reference) packet having a time base;

a corresponding plurality of buffers for receiving said data packets in respective ones of said data streams;

means for multiplexing said data packets from said plurality of buffers to a common data stream said multiple means operating according to an algorithm that includes buffer fillness and program data rate;

means for calculating a time correction for non uniform jitter experienced by said data packets due to multiplexing said calculating means including means for determining the average time delay incurred by a data packet in its associated buffer; and means for adjusting the time base of said PCR packet in said common data stream with said calculated time correction.

7. The transmission system of claim 6, wherein said calculating means further comprises:

means for dividing said buffer fullness by said program data rate to determine a packet time delay; and means for subtracting said average time delay from said packet time delay in determining said time correction.

8. The transmission system of claim 6, wherein said adjusting means comprises:

means for extracting said PCR time base from said PCR packet;

means for correcting said extracted PCR time base with aid time correction; and means for inserting said corrected PCR time base in said PCR packet.

9. An MPEG data transmission system comprising:

means for supplying a plurality of asynchronous MPEG data streams of differing data rates, each data stream including data packets, with certain of the data packets constituting a PCR (Program clock reference) packet having a time base;

a corresponding plurality of buffers receiving said data packets from respective ones of said data streams;

multiplexing means for multiplexing said data packets from said buffers to a common data stream in accordance with an algorithm that includes buffer fullness and program data rate;

means for dividing said buffer fullness by said program data rate to determine a packet time delay for a packet being multiplexed;

means for determining an average time delay for a packet in its respective buffer;

means for subtracting said average time delay from said packet time delay to determine non uniform jitter experienced by said packet being multiplexed;

means for extracting said time base from said PCR packet;

means for correcting said extracted time base in accordance with said determined non uniform jitter; and means for inserting said corrected time base in said PCR packet.

* * * * *